(12) United States Patent
Li et al.

(10) Patent No.: US 10,627,975 B2
(45) Date of Patent: Apr. 21, 2020

(54) METHOD, APPARATUS, AND VEHICLE FOR CONTROLLING AN ON-VEHICLE DISPLAY SYSTEM

(71) Applicant: BOE TECHNOLOGY GROUP CO., LTD., Beijing (CN)

(72) Inventors: Xin Li, Beijing (CN); Guanshan Tong, Beijing (CN); Youmei Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 125 days.

(21) Appl. No.: 15/578,579

(22) PCT Filed: Jul. 3, 2017

(86) PCT No.: PCT/CN2017/091482
§ 371 (c)(1),
(2) Date: Nov. 30, 2017

(87) PCT Pub. No.: WO2018/019089
PCT Pub. Date: Feb. 1, 2018

(65) Prior Publication Data
US 2018/0329545 A1 Nov. 15, 2018

(30) Foreign Application Priority Data
Jul. 29, 2016 (CN) .......................... 2016 1 0619741

(51) Int. Cl.
*B60Q 1/00* (2006.01)
*G06F 3/048* (2013.01)
(Continued)

(52) U.S. Cl.
CPC .............. *G06F 3/048* (2013.01); *B60K 35/00* (2013.01); *B60R 1/00* (2013.01);
(Continued)

(58) Field of Classification Search
None
See application file for complete search history.

(56) References Cited

U.S. PATENT DOCUMENTS

| | | | | |
|---|---|---|---|---|
| 5,892,598 A | * | 4/1999 | Asakawa | G02B 27/01 359/13 |
| 2012/0139280 A1 | * | 6/2012 | Jung | B60K 35/00 296/37.12 |

(Continued)

FOREIGN PATENT DOCUMENTS

| | | |
|---|---|---|
| CN | 102555927 A | 7/2012 |
| CN | 102729888 A | 10/2012 |

(Continued)

OTHER PUBLICATIONS

International Search Report & Written Opinion dated Sep. 28, 2017, regarding PCT/CN2017/091482.
(Continued)

*Primary Examiner* — Julie B Lieu
(74) *Attorney, Agent, or Firm* — Intellectual Valley Law, P.C.

(57) ABSTRACT

A method, apparatus, and vehicle for controlling an on-vehicle display system are provided. The control method includes selecting, one of a display mode for information display and a non-display mode for light control in a vehicle, as a target operation mode. The control method also includes controlling the on-vehicle display system to display effective information when the target operation mode is the display mode. Further, the control method includes controlling the on-vehicle display system to control light in the vehicle when the target operation mode is the auxiliary mode.

18 Claims, 6 Drawing Sheets

(51) Int. Cl.
  *B60R 1/00*     (2006.01)
  *B60K 35/00*    (2006.01)
  *G02F 1/1334*   (2006.01)

(52) U.S. Cl.
  CPC .... *B60K 2370/152* (2019.05); *B60K 2370/52* (2019.05); *B60R 2300/404* (2013.01); *B60R 2300/8066* (2013.01); *G02F 1/1334* (2013.01)

(56) References Cited

U.S. PATENT DOCUMENTS

| | | | |
|---|---|---|---|
| 2016/0379310 A1 | 12/2016 | Madigan et al. | |
| 2018/0186288 A1* | 7/2018 | Batten | B60R 1/00 |
| 2018/0312106 A1* | 11/2018 | Tatara | B60Q 1/26 |
| 2018/0312111 A1* | 11/2018 | Bongwald | B60R 1/00 |

FOREIGN PATENT DOCUMENTS

| | | | |
|---|---|---|---|
| CN | 103264663 A | 8/2013 | |
| CN | 205819058 U | 12/2016 | |
| JP | 2008134423 A | 6/2008 | |
| WO | 2014168566 A | 10/2014 | |

OTHER PUBLICATIONS

First Office Action in the Indian Patent Application No. 201837000900, dated Dec. 30, 2019.

\* cited by examiner

METHOD, APPARATUS, AND VEHICLE FOR CONTROLLING AN ON-VEHICLE DISPLAY SYSTEM

CROSS-REFERENCE TO RELATED APPLICATION

This application is a national stage application under 35 U.S.C. § 371 of International Application No. PCT/CN2017/091482, filed Jul. 3, 2017, which claims the priority of Chinese patent application No. 201610619741.7, filed on Jul. 29, 2016, the entirety of which is incorporated herein by reference.

FIELD OF THE DISCLOSURE

The present disclosure generally relates to the field of display technology and, more particularly, relates to a method, apparatus, and vehicle for controlling an on-vehicle display system.

BACKGROUND

A display system configured on a vehicle may be referred to as an on-vehicle display system. The on-vehicle display system may have a single function, i.e., the display function. Consequently, utilization rate of the on-vehicle display system is low and needs to be improved.

The disclosed method, apparatus, and vehicle are directed to at least partially alleviate one or more problems set forth above and to solve other problems in the art.

BRIEF SUMMARY OF THE DISCLOSURE

One aspect of the present disclosure includes a control method of an on-vehicle display system. The control method includes selecting, one of a display mode for information display and a non-display mode for light control in a vehicle, as a target operation mode. The control method also includes controlling the on-vehicle display system to display effective information when the target operation mode is the display mode. Further, the control method includes controlling the on-vehicle display system to control light in the vehicle when the target operation mode is the non-display mode.

Optionally, the vehicle is provided with an accommodating chamber penetrating through an interior space and an exterior space of the vehicle, and an optical waveguide display assembly is provided in the accommodating chamber. The non-display mode includes at least one of a transparent mode, a blocking mode and an illumination mode.

Optionally, the control method includes detecting a status of a door lock of the vehicle to obtain a first detection result. The control method also includes starting a camera facing a rear area of the vehicle, when the first detection result indicates that the status of the door lock of the vehicle is switched from a closed state to an open state. When the first detection result indicates that the status of the door lock of the vehicle is switched from the closed state to the open state, the step of selecting one of the display mode and the non-display mode as the target operation mode includes: selecting the display mode as the target operation mode. The effective information includes information obtained based on an image captured by the camera.

Optionally, the control method includes detecting whether the vehicle is in one of a braking state and a steering state to obtain a second detection result. The control method also includes starting a camera facing a rear area of the vehicle, when the second detection result indicates that the vehicle is in one of the braking state and the steering state. When the second detection result indicates that the vehicle is in the braking state and the steering state, the step of selecting one of the display mode and, the non-display mode as the target operation mode includes: selecting the display mode as the target operation mode. The effective information includes information obtained based on an image captured by the camera.

Optionally, the control method includes detecting a status of a trunk lock to obtain a third detection result. When the third detection result indicates that the status of the trunk lock is switched from a closed state to an open state, the step of selecting one of the display mode and the non-display mode as the target operation mode includes: selecting the display mode as the target operation mode. The effective information includes remaining capacity of the trunk.

Optionally, the effective information includes environmental information.

Optionally, the optical waveguide display assembly includes an optical waveguide transmission structure. The optical waveguide transmission structure includes a first substrate, a second substrate, and a liquid crystal layer formed between the first and second substrates.

Optionally, the liquid crystal layer includes a polymer and liquid crystal particles distributed in the polymer. A refractive index of the liquid crystal particles is different from a refractive index of the polymer when applying an electric field. The refractive index of the liquid crystal particles is the same as the refractive index of the polymer when not applying the electric field.

Another aspect of the present disclosure includes a control apparatus of an on-vehicle display system. The control apparatus includes a selection circuit, configured to select, one of a display mode for information display and a non-display mode for light control in a vehicle, as a target operation mode. The control apparatus also includes a first controller, configured to control the on-vehicle display system to display effective information when, the target operation mode is the display mode. Further, the control apparatus includes a second controller, configured to control the on-vehicle display system to operate in a manner that affects light in the vehicle when the target operation mode is the non-display mode.

Optionally, the vehicle is provided with an accommodating chamber penetrating through an interior space and an exterior space of the vehicle, and an optical waveguide display assembly is provided in the accommodating chamber. The non-display mode includes at least one of a transparent mode, a blocking mode and an illumination mode.

Optionally, the control apparatus includes a first detector, configured to detect a status of a door lock of the vehicle to obtain a first detection result. The control apparatus also includes a first start circuit, configured to start a camera facing a rear area of the vehicle, when the first detection result indicates that the status of the door lock of the vehicle is switched from a closed state to an open state. When the first detection result indicates that the status of the door lock of the vehicle is switched from the closed state to the open state, the selection circuit is used to select the display mode as the target operation mode. The effective information includes information obtained based on an image captured by the camera.

Optionally, the control apparatus includes a second detector, configured to detect whether the vehicle is in one of a braking state and a steering state to obtain a second detection result. The control apparatus also includes a second start circuit, configured to start a camera facing a rear area of the vehicle when the second detection result indicates that the vehicle is in one of the braking state and the steering state. When the second detection result indicates that the vehicle is in one of the braking state and the steering state, the selection circuit is used to select the display mode as the target operation mode. The effective information includes information obtained based on an image captured by the camera.

Optionally, the control apparatus includes a third detector configured to detect a status of a trunk lock to obtain a third detection result. When the third detection result indicates that the status of the trunk lock is switched from a closed state to an open state, the selection circuit is used to select the display mode as the target operation mode. The effective information includes remaining capacity of the trunk.

Optionally, the effective information includes environmental information.

Another aspect of the present disclosure includes a vehicle. The vehicle includes the disclosed on-vehicle display system based on an optical waveguide display assembly. The vehicle also includes the disclosed control apparatus.

Another aspect of the present disclosure includes a control apparatus of a vehicle. The control apparatus includes an on-vehicle display system, a memory, and at least one processor coupled to the on-vehicle display system and the memory. The memory stores computer-executable instructions for controlling the at least one processor to: select, one of a display mode for information display and a non-display mode for light control in a vehicle, as a target operation mode; control the on-vehicle display system to display effective information when the target operation mode is the display mode; and control the on-vehicle display system to operate in a manner that affects light in the vehicle when the target operation mode is the non-display mode.

Optionally, the vehicle is provided with an accommodating chamber penetrating through an interior space and an exterior space of the vehicle, and an optical waveguide display assembly is provided in the accommodating chamber. The non-display mode includes at least one of a transparent mode, a blocking mode and an illumination mode.

Optionally, the at least one processor is further configured to: detect a status of a door lock of the vehicle to obtain a first detection result; and start a camera facing a rear area of the vehicle, when the first detection result indicates that the status of the door lock of the vehicle is switched from a closed state to an open state. When the first detection result indicates that the status of the door lock of the vehicle is switched from the closed state to the open state, the at least one processor is used to select the display mode as the target operation mode. The effective information includes information obtained based on an image captured by the camera.

Optionally, the at least one processor is further configured to: detect whether the vehicle is in one of a braking state and a steering state to obtain a second detection result; and start a camera facing a rear area of the vehicle when the second detection result indicates that the vehicle is in one of the braking state and the steering state. When the second detection result indicates that the vehicle is in one of the braking state and the steering state, the at least one processor is used to select the display mode as the target operation mode. The effective information includes information obtained based on an image captured by the camera.

Optionally, the at least one processor is further configured to detect a status of a trunk lock to obtain a third detection result. When the third detection result indicates that the status of the trunk lock is switched from a closed state to an open state, the at least one processor is used to select the display mode as the target operation mode. The effective information includes remaining capacity of the trunk.

Other aspects of the present disclosure ca be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to exemplary embodiments of the disclosure, Which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Transparent display devices may be used in store windows, smart glasses, smart helmet, and the like. When a transparent display device is in operation, the scene behind the transparent display device can be clearly seen through.

A transparent display device may include an optical waveguide transparent display module, to provide light transmittance and better display.

The optical waveguide display assembly may include an optical waveguide transmission structure, which may include: a tint substrate; a second substrate; and a liquid crystal layer formed between the first and second substrates. When receiving an electric signal, the liquid crystal layer may be in a scattering state, which damages the total reflection conditions of the light. In this case, the light can be transmitted to exit the optical waveguide transmission structure. In other cases, when the liquid crystal layer is in a transmitting state, the light may undergo a total reflection within the optical waveguide transmission structure and cannot exit the optical waveguide transmission structure.

The present disclosure provides an on-vehicle display system and a method apparatus, and vehicle for controlling the on-vehicle display system. An exemplary on-vehicle display system may include an optical waveguide display assembly, an accommodating chamber for holding the optical waveguide display assembly, cameras for monitoring and capturing information of the surrounding of the vehicle, and sensor(s), etc.

Based on the optical waveguide display assembly, the disclosed on-vehicle display system may include two operation modes. One is a display mode for information display, such as usual information display, and the other is a non-display mode. e.g., an auxiliary mode for light control in the vehicle, when the disclosed on-vehicle display system is not used for displaying information. The on-vehicle display system may be able to choose from the two operation modes, according to a certain strategy or scheme. As such, in addition to the display function, the on-vehicle display system may be able to facilitate light control in the vehicle. The disclosed on-vehicle display system may be multi-functional with improved utilization rate.

Figure 1:
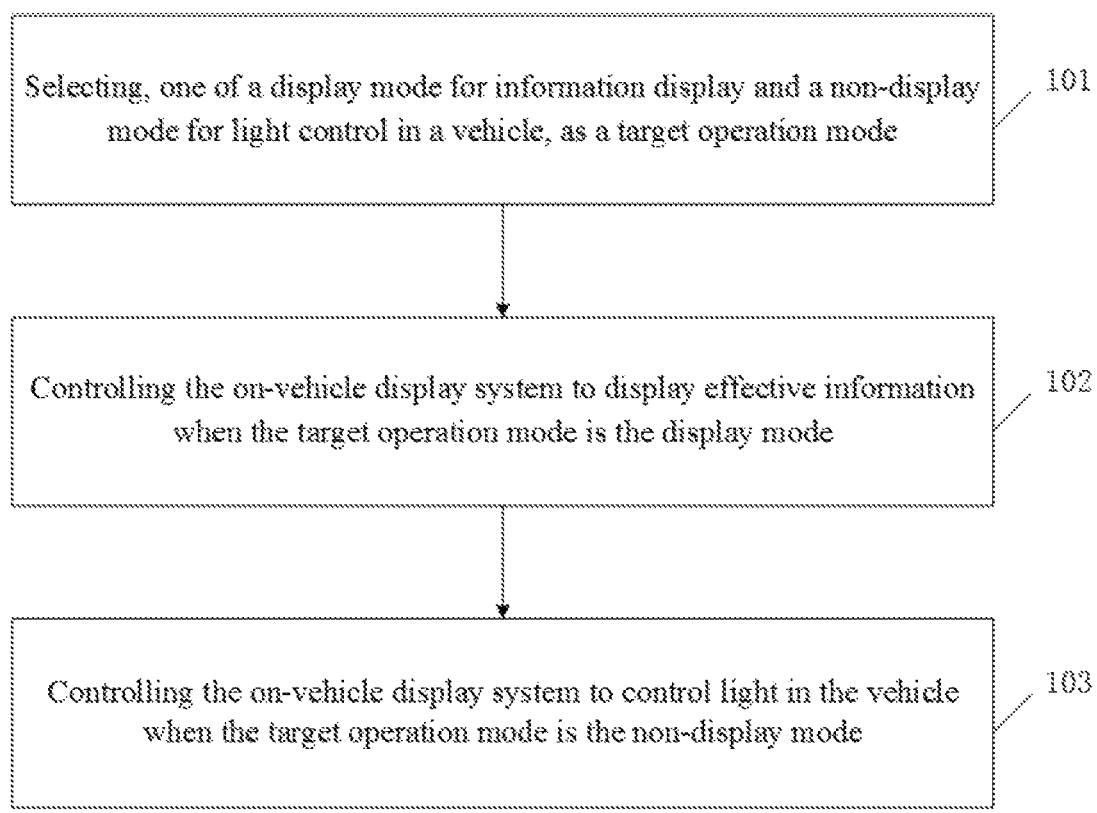
FIG. 1 illustrates a flow chart of an exemplary control method of an on-vehicle display system consistent with disclosed embodiments.

Referring to FIG. 1, a control method of the on-vehicle display system based on the optical waveguide display assembly may include the following exemplary steps.

Step 101: One of a display mode for information display and a non-display mode for light control in the vehicle, e.g., an auxiliary mode for light control in the vehicle when not being used for information display may be selected as a target operation mode.

Step 102: When the target operation mode is the display mode, the on-vehicle display system may be controlled to display effective information.

Step 103: When the target operation mode is the auxiliary mode, the on-vehicle display system may be controlled to control the light in the vehicle.

In the disclosed control method of the on-vehicle display system, when the information display is required or otherwise in use, the on-vehicle display system may be controlled to display the effective information. When the information display is not required or otherwise in use, the light in the vehicle may be controlled by the optical waveguide display assembly which has characteristics of a variety of states. Thus, the disclosed on-vehicle display system may be multi-functional with improved utilization rate.

The disclosed optical waveguide display assembly may include an optical waveguide transmission structure. The optical waveguide transmission structure may include: a first substrate; a second substrate; and a liquid crystal layer formed between the first and second substrates. Thus, only the liquid crystal layer in the optical waveguide display assembly may have effect on the light. For the optical waveguide display assembly, the liquid crystal layer may include the following two parts: a polymer and liquid crystal particles distributed in the polymer. The liquid crystal layer may have the following characteristics at the same time: when applying an electric field, a refractive index of the liquid crystal particles may be different from a refractive index of the polymer; and when not applying the electric field, the refractive index of the liquid crystal particles may be the same as the refractive index of the polymer.

The above auxiliary mode may be one of the following modes depending on whether the electric field is applied: an illumination mode, a transparent mode, and a blocking mode.

In the transparent mode, the light source may not be in operation and the electric field may not be applied to the liquid crystal layer. The refractive index of the entire liquid crystal layer may be uniform. Therefore, the light outside the vehicle can be incident on the vehicle through the optical waveguide display assembly, and the light inside the vehicle can be incident on the outside of the vehicle through the optical waveguide display assembly.

In the blocking mode, the light source may be in operation, while the electric field may not be applied to the liquid crystal layer. Thus, the refractive index of the liquid crystal particles may be different from the refractive index of the polymer. After the light outside/inside the vehicle is incident on the liquid crystal layer, most of the light may be reflected back in a direction to the original starting point. In other words, most of the light outside/inside the vehicle cannot penetrate through the liquid crystal layer and be incident on the inside/outside of the vehicle.

In the illumination mode, the light source may be in operation and the electric field may not be applied to the liquid crystal layer at the same time. By the influence of the polymer, the liquid crystal particles may be randomly oriented to form a refractive index difference between the liquid crystal particles and the polymer. Therefore, the light may be refracted and reflected at the surfaces of the liquid crystal particles, and total reflection conditions of portions of the light may be damaged. Thus, after multiple reflection and refraction, portions of the light may be transmitted through the liquid crystal box to form the illumination light.

Based on the disclosed method, when the vehicle is provided with an accommodating chamber penetrating through an interior space and an exterior space of the vehicle, the optical waveguide display assembly may be provided in the accommodating chamber. The optical waveguide display assembly may be multi-functional by using one or more modes in the auxiliary mode.

When driving at night, people in the vehicle may have reading needs. In the conventional technique, the illumination in the vehicle may be realized by a light system independent from the on-vehicle display system. In the present disclosure, the light source of the optical waveguide display assembly may be controlled to operate and to generate the electric field that may affect the liquid crystal layer by simultaneously sending electrical signals to the pixel electrode and the common electrode of the optical waveguide transmission structure, such that, the liquid crystal particles may be randomly oriented by the influence of the polymer to form the refractive index difference between the liquid crystal particles and polymer.

In this case, after the light emitted from the light source in incident on the liquid crystal layer, the light may be refracted and reflected at the surfaces of the liquid crystal particles, and the total reflection conditions of portions of the light may be damaged. Thus, after multiple reflection and refraction, portions of the light may be transmitted through the liquid crystal box to form the illumination light.

Therefore, in the present disclosure, the independent light system may not need to be provided in the vehicle, both the functions of display and light may be realized by using the on-vehicle display system. The illumination may not use the light emitted when displaying, and may use the light emitted when not displaying the effective information.

The conventional windows or skylight systems may be transparent, or opaque. In this case, for the transparent windows, the light transmittance may only be considered, while privacy may not be guaranteed. For the opaque windows, although user's privacy may be protected, the luminance in the vehicle may only be realized by rolling down the window when the user does not have the privacy requirements. In this case, the luminance in the vehicle may be inevitably affected by some weather factors, such as the windy weather, and heavy rain, etc., rolling down the window may have extremely inconvenient impact on the driver and the passengers in the vehicle.

In the present disclosure, when the window is closed, the transparent mode or the blocking mode may be selected. In the transparent mode, the light source may not be in operation and the electric field may not be applied to the liquid crystal layer. Thus, the refractive index of the entire liquid crystal layer may be uniform. Therefore, the light outside the vehicle can be incident on the vehicle through the optical waveguide display assembly, and the light inside the vehicle can be incident on the outside of the vehicle through the optical waveguide display assembly, such that the passengers in the vehicle can see the scene outside the vehicle.

In the blocking mode, the light source may not be in operation, while the electric field may be applied to the liquid crystal layer and, thus, the refractive index of the liquid crystal particles may be different from the refractive index of the polymer. After the light outside/inside the vehicle is incident on the liquid crystal layer, most of the light may be reflected back in the direction to the original starting point. In other words, most of the light outside/inside the vehicle cannot penetrate through the liquid crystal layer and be incident on the inside/outside of the vehicle, such that the space in the vehicle may be in a relatively private state. The above blocking mode may not only be used in an occasion to protect the privacy in the vehicle, but also may be used in other occasions, such as shading, etc.

Therefore, the disclosed on-vehicle display system display have functions of display, privacy protection and shading, etc. Thus, the disclosed on-vehicle display system may be multi-functional with improved utilization rate.

In one embodiment, one of the display mode and the auxiliary mode may be first selected as the target operation mode. There are a variety of manners to select the operation mode, such as user's selection, or automatic selection based on some collected information, etc. The following is a detailed description of the automatic selection.

Currently, many vehicles are equipped with cameras, such as reversing surveillance cameras installed on rear of the vehicle. These cameras may only be used in some specific circumstances, thus the utilization rate may not be high.

Currently, lots of accidents may occur when the user is getting out of the vehicle. The user may not pay attention to the person, bicycles, or any vehicles corning from the rear, resulting in a collision with person, or bicycles, etc., coming from the rear. To avoid the above situation, in one embodiment, the status of the on-vehicle display system may be controlled based on a status of a door lock of the vehicle, to increase driving safety.

Figure 2A:
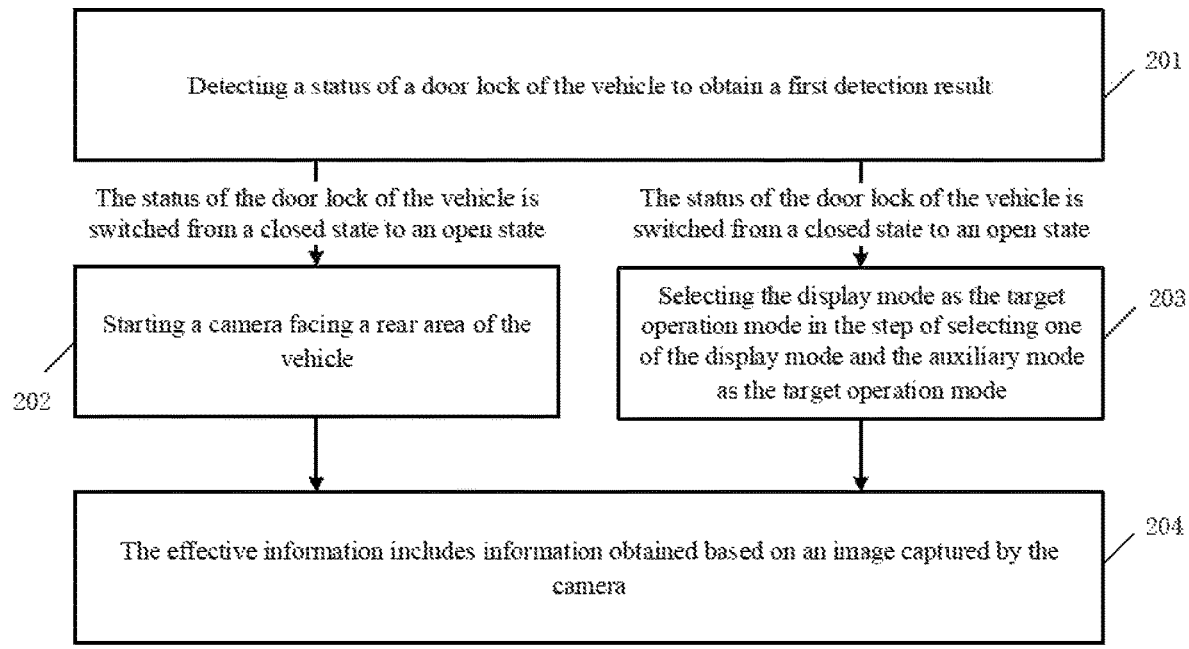
FIG. 2a illustrates a flow chart of another exemplary control method of an on-vehicle display system consistent with disclosed embodiments.

Referring to FIG. 2, another control method of the on-vehicle display system may include the following exemplary steps.

Step 201: The status of the door lock of the vehicle may be detected to obtain a first detection result.

Step 202: A camera facing a rear area of the vehicle may be started when the first detection result indicates that the status of the door lock of the vehicle is switched from a closed state to an open state.

Step 203: When the first detection result indicates that the status of the door lock of the vehicle is switched from the closed state to the open state, the step of selecting one of the display mode and the auxiliary mode as the target operation mode includes: selecting the display mode as the target operation mode.

Step 204: When the target operation mode is the display mode, the on-vehicle display system may be controlled to display the information obtained based on an image captured by the camera.

Figure 2B:
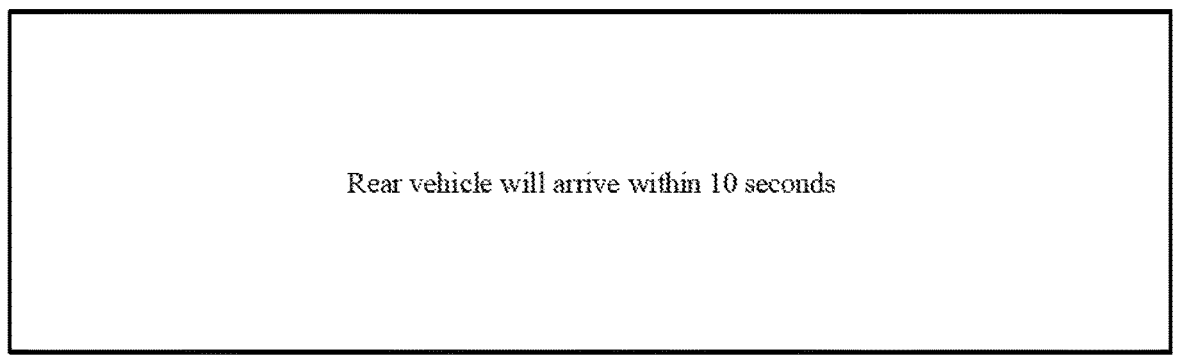
FIG. 2b illustrates a schematic diagram of exemplary display information corresponding to the flow chart shown in FIG. 2a consistent with disclosed embodiments.

The above information obtained based on the image captured by the camera may be the image itself captured by the camera, or may be an alarm information obtained by processing the image captured by the camera, such as "Rear vehicle is coming, please pay attention" "Rear vehicle will arrive within 10 seconds" (as shown in FIG. 2b), "Bicycle behind the vehicle", or an alarm icon, etc. The form and content of the alarm information are not limited in the present disclosure.

In one embodiment, when the status of the door lock of the vehicle is switched from the closed state to the open state, the camera may be started. The image of the rear area of the vehicle captured by the camera or the alarm information may be displayed by using the on-vehicle display system, such that the user may determine the situation in the rear area of the vehicle before getting out of the vehicle, through the image of the rear area of the vehicle or the alarm information displayed by the on-vehicle display system, to decide whether to get out of the vehicle immediately. Thus, passengers' safety may be improved.

Currently, lots of accidents may occur during a braking or steering process when the user does not pay attention to the vehicles coining from the rear. To avoid the above situation, the status of the on-vehicle display system may be controlled based on whether the vehicle is in one of a braking state and a steering state to improve the driving safety.

Figure 3:
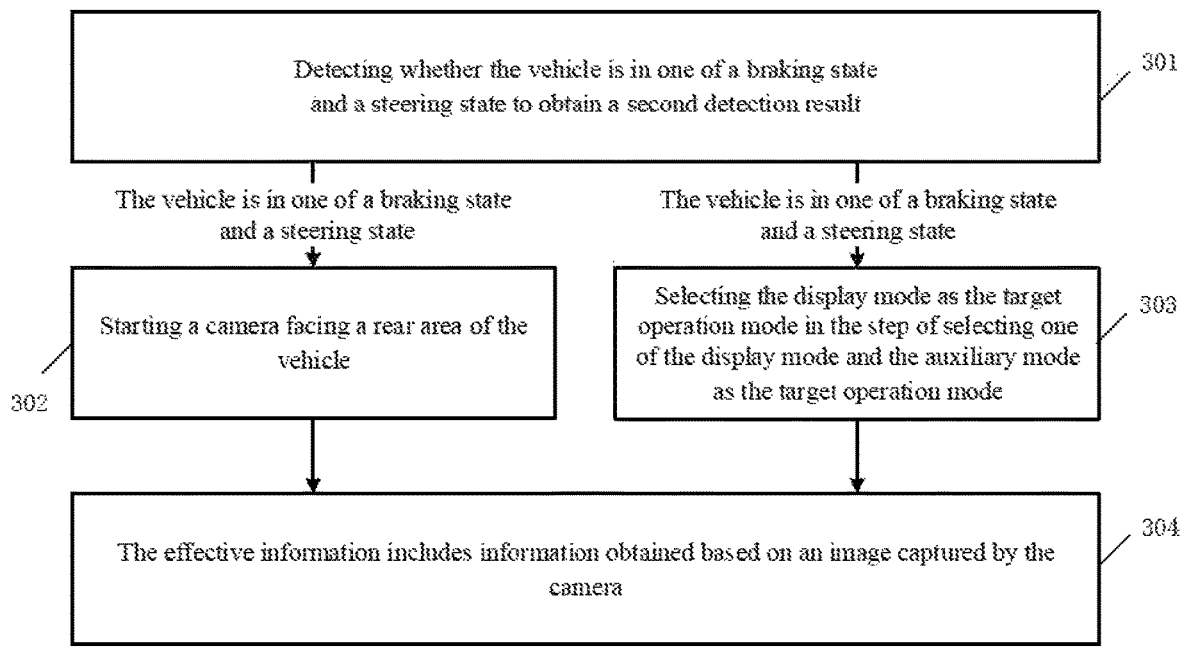
FIG. 3 illustrates a flow chart of another exemplary control method of an on-vehicle display system consistent with disclosed embodiments.

Referring to FIG. 3, another control method of the on-vehicle display system may include the following exemplary steps.

Step 301: Whether the vehicle is in one of the braking state and the steering state may be detected to obtain a second detection result.

Step 302: The camera facing the rear area of the vehicle may be started when the second detection result indicates that the vehicle is in one of the braking state and the steering state.

Step 303: When the second detection result indicates that the vehicle is in one of the braking state and the steering state, the step of selecting one of the display mode and the auxiliary mode as the target operation mode includes: selecting the display mode as the target operation mode.

Step 304: When the target operation mode is the display mode, the on-vehicle display system may be controlled to display the information obtained based on the image captured by the camera.

The above information obtained based on the image captured by the camera may be the image itself captured by the camera, or may be an alarm information obtained by processing the image captured by the camera, such as "Rear vehicle is coming, it's danger to change lanes/brake", or an alarm icon, etc. The form and contents of the alarm information are not limited.

In one embodiment, when detecting that the vehicle is in one of the braking state and the steering state, the camera may be started. The image of the rear area of the vehicle captured by the camera or the alarm information may be displayed by using the on-vehicle display system, such that the user may determine the situation in the rear area of the vehicle, through the image of the rear area of the vehicle or the alarm information displayed by the on-vehicle display system, to decide whether to cancel the braking or steering process. Thus, the driving safety may be improved.

Figure 4A:
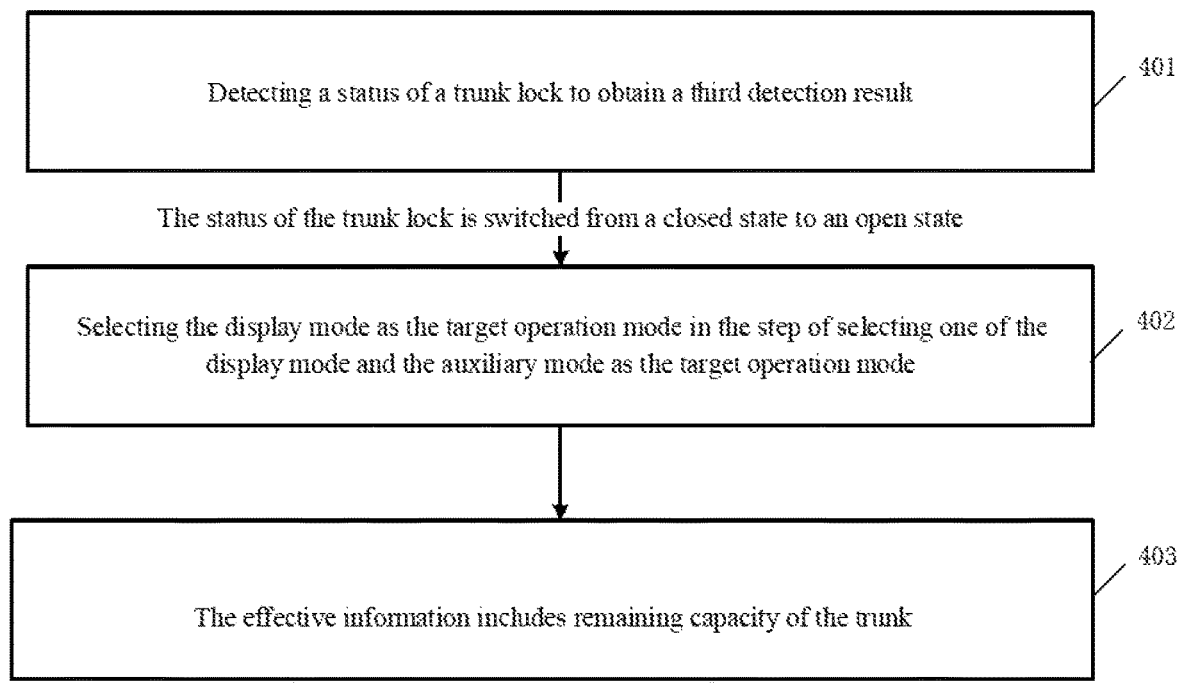
FIG. 4a illustrates a flow chart of another exemplary control method of an on-vehicle display system consistent with disclosed embodiments.

Many cases, the user may need to carry a large amount of belongings when using the vehicle, such as a car. However, because of the limited space in the vehicle, the user may need to know available capacity of the trunk for stowing the belongings and the user may then be able to make decisions on the appropriate belongings to be carried in the trunk of the vehicle. Referring to FIG. 4a, another control method of the on-vehicle display system may include the following exemplary steps.

Step 401: A status of a trunk lock may be detected to obtain a third detection result.

Step 402: When the third detection result indicates that the status of the trunk lock is switched from a closed state to an open state, the step of selecting one of the display mode and the auxiliary mode as the target op ration mode includes: selecting the display mode as the target operation mode.

Step 403: When the third detection result indicates that the status of the trunk lock is switched from the closed state to the open state, the on-vehicle display system may be controlled to display remaining capacity or available capacity of the trunk.

Figure 4B:
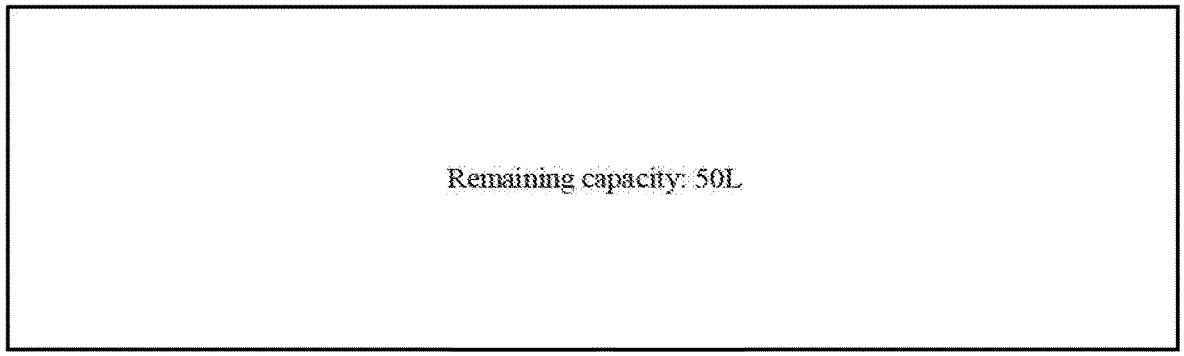
FIG. 4b illustrates a schematic diagram of exemplary display information corresponding to the flow chart shown in FIG. 4a consistent with disclosed embodiments.

In this manner, the information shown in FIG. 4b may be used to hint the user about the remaining capacity of the trunk, such that the user can better plan the carry items for going out.

Figure 5:
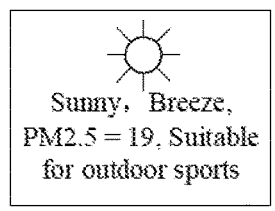
FIG. 5 illustrates a schematic diagram of exemplary other information displayed by an on-vehicle display system consistent with disclosed embodiments.

In one embodiment, referring to FIG. 5, when the target operation mode is the display mode, the effective information may also be environmental information collected by the network or the vehicle external sensor and/or dynamic suggestions based on the environmental information. The environmental information may include outside temperature, weather, fine particulate matter (PM2.5) in the air, road conditions, real-time traffic conditions, and ultra-violet index, etc.

Figure 6:
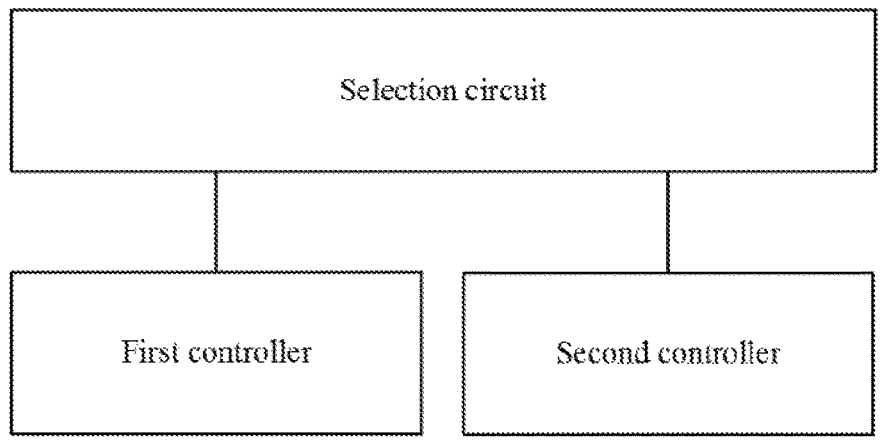
FIG. 6 illustrates a structural diagram of an exemplary control apparatus of an on-vehicle display system consistent with disclosed embodiments.

A control apparatus of the on-vehicle display system based on the optical waveguide display assembly is also provided in the present disclosure. Referring to FIG. 6, the control apparatus may include a selection circuit, a first controller and a second controller. The first selection circuit may be used to select, one of the display mode for information display and the auxiliary mode for light control when the optical, waveguide display assembly is not used for displaying information, as the target operation mode. The first controller may be used to control the on-vehicle display system to display the effective information when the target operation mode is the display mode. The second controller may be used to control the on-vehicle display system to operate in a manner that affects the light in the vehicle when the target operation mode is the auxiliary mode.

For the above control apparatus, the vehicle may be provided with an accommodating chamber penetrating through an interior space and an exterior space of the vehicle, and the optical waveguide display assembly may be provided in the accommodating chamber. The auxiliary mode may include at least one of the transparent mode, the blocking mode and the illumination mode.

Figure 7:
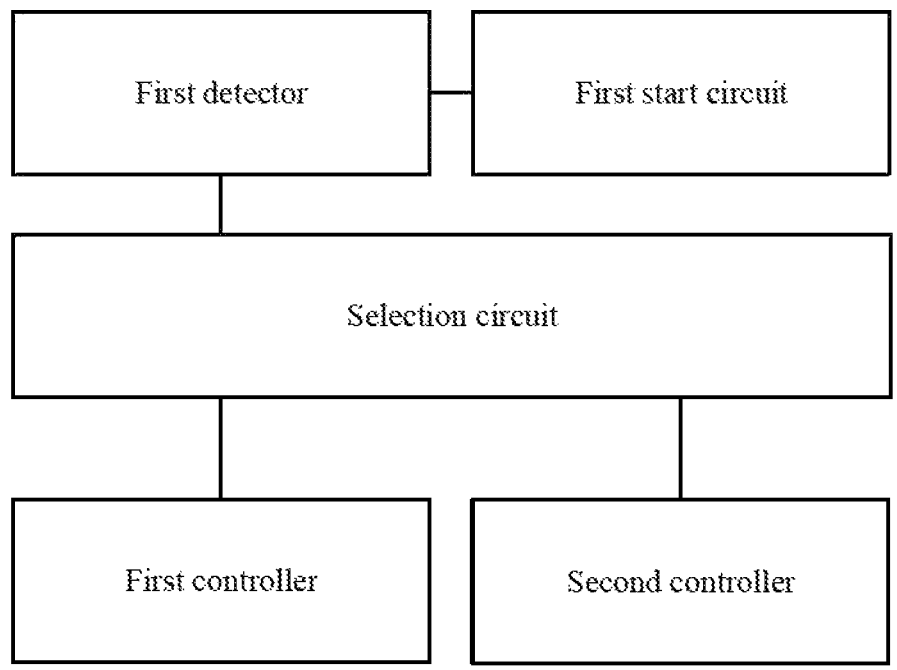
FIG. 7 illustrates a structural diagram of another exemplary control apparatus of an on-vehicle display system consistent with disclosed embodiments.

Referring to FIG. 7, the above control apparatus may also include a first detector, and a first start circuit. The first detector may be used to detect a status of a door lock of the vehicle to obtain a first detection result. The first start circuit may be used to start a camera facing a rear area of the vehicle when the first detection result indicates that the status of the door lock of the vehicle is switched from a closed state to an open state.

In one embodiment, the above selection circuit may be used to select the display mode as the target operation mode when the first detection result indicates that the status of the door lock of the vehicle is switched from the closed state to the open state. The effective information may be the information obtained based on the image captured by the camera.

Figure 8:
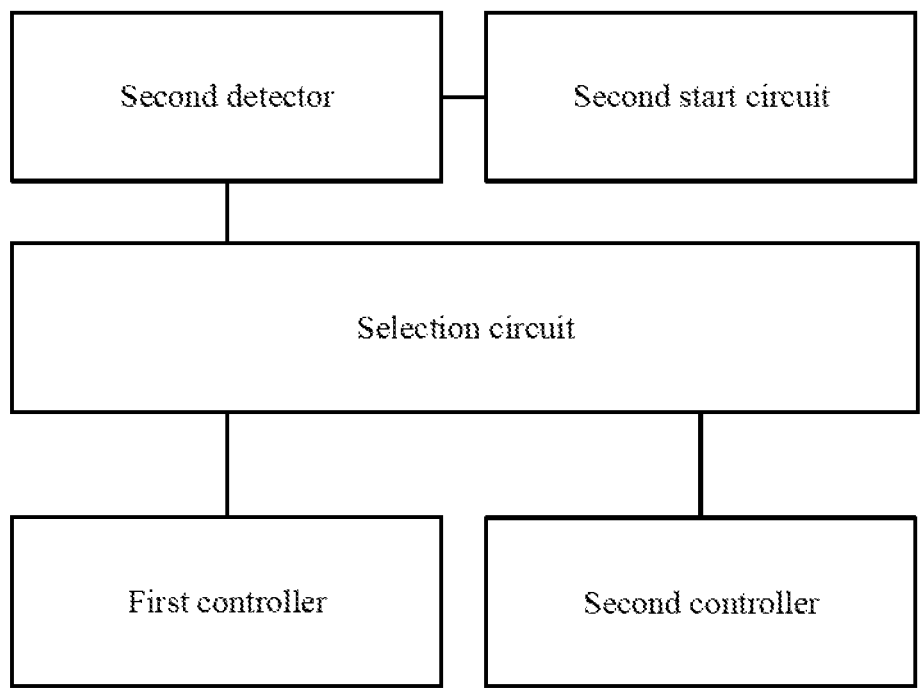
FIG. 8 illustrates a structural diagram of another exemplary control apparatus of an on-vehicle display system consistent with disclosed embodiments.

Referring to FIG. 8, in addition, the above control apparatus may include a second detector, and a second start circuit. The second detector may be used to detect whether the vehicle is in one of a braking state and a steering state to obtain a second detection result. The second start circuit may be used to start the camera facing the rear area of the vehicle when the second detection result indicates that the vehicle is in one of the braking state and the steering state.

In one embodiment, the selection circuit may be used to select the display mode as the target operation mode when the second detection result indicates that the vehicle is in one of the braking state and the steering state. The effective information may be the information obtained based on the image captured by the camera.

Figure 9:
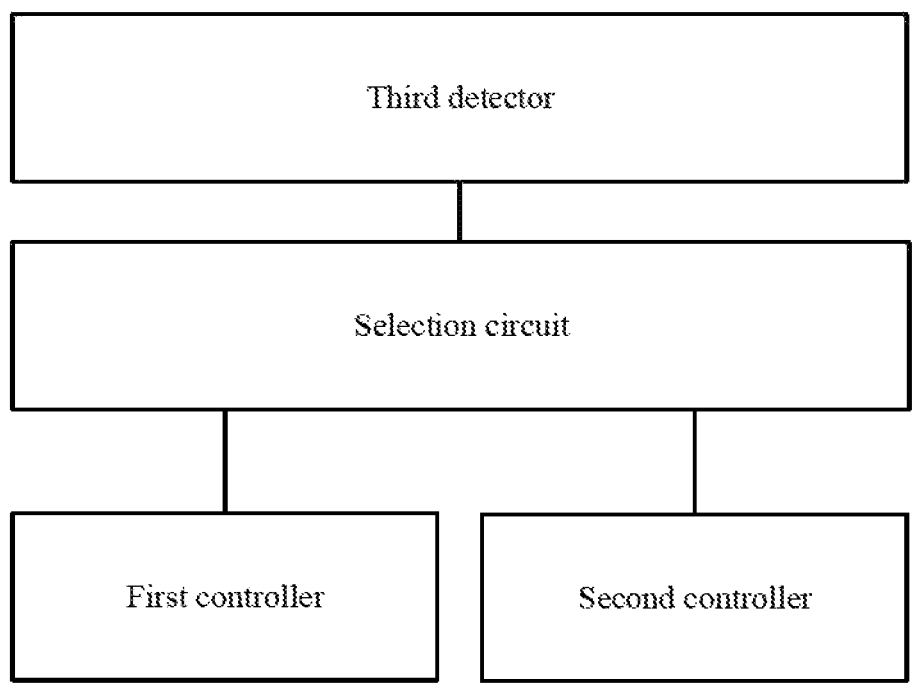
FIG. 9 illustrates a structural diagram of another exemplary control apparatus of an on-vehicle display system consistent with disclosed embodiments.

Referring to FIG. 9, further, the above control apparatus may include a third detector. The third detector may be used to detect a status of a trunk lock to obtain a third detection result.

In one embodiment, the selection circuit may be used to select the display mode as the target operation mode when the status of the trunk lock is switched from a closed state to an open state. The effective information may be remaining capacity of the trunk.

In one embodiment, for the above control apparatus, when the target operation mode is the display mode, the effective information may also be environmental information.

A vehicle is also provided in the present disclosure. The vehicle may include an on-vehicle display system based on an optical waveguide display assembly. The vehicle may also include any of the above-described control apparatus.

In one embodiment, the modules/units may be realized by using software to facilitate execution by various types of processors. For example, an identified executable code module may include one or more physical or logical modules of computer instructions. For example, the identified executable code module may be constructed as an object, a process, or a function. In spite of this, the executable code of the identified module may not need to be physically located together, while may include different instructions stored in different bits. When logically combined, the instructions may constitute the module and realize the purpose of the module.

In real applications, the executable code module may be a single instruction or a plurality of instructions, and may even be distributed over a plurality of different code segments, distributed among different programs, and distributed across a plurality of memory devices. Similarly, an operational data may be identified within the module and may be realized in any appropriate form and organized within any data structure with appropriate type. The operational data may be collected as a single data set, or may be distributed at different locations (including at different storage devices). At least portions of the operational data, may be stored on the system or network as electronic signals.

When the module can be realized by using software, taking into account the level of conventional hardware technology, the functions of all of the modules that can be, realized in software can be realized by building corresponding hardware circuits by those skilled in the art. The hardware circuits may include conventional very-large-scale integration (VLSI) circuits, gate arrays, or conventional semiconductor or other discrete components, such as logic chips, and transistors, etc. The modules may also be realized by programmable hardware devices, such as programmable gate arrays, programmable array logic, and programmable logic devices, etc.

For example, various embodiments of present disclosure provide a control apparatus of a vehicle. The vehicle may include an on-vehicle display system, a memory, and at least one processor coupled to the on-vehicle display system and the memory. The memory stores computer-executable instructions for controlling the at least one processor to: select, one of a display mode for information display and an auxiliary mode for light control in a vehicle when not being used for information display, as a target operation mode; control the on-vehicle display system to display effective information when the target operation mode is the display mode; and control the on-vehicle display system to operate in a manner that affects light in the vehicle when the target operation mode is the auxiliary mode.

The vehicle may be provided with an accommodating chamber penetrating through an interior space and an exterior space of the vehicle, and the optical waveguide display assembly may be provided in the accommodating chamber. The auxiliary mode may include at least one of the transparent mode, the blocking mode and the illumination mode.

The at least one processor may also be used to detect a status of a door lock of the vehicle to obtain a first detection result; and start a camera facing a rear area of the vehicle when the first detection result indicates that the status of the door lock of the vehicle is switched from a closed state to an open state. When the first detection result indicates that the status of the door lock of the vehicle is switched from the closed state to the open state, the at least one processor may be used to select the display mode as the target operation mode. The effective information may include information obtained based on an image captured by the camera.

In addition, the at least one processor may be used to: detect whether the vehicle is in one of a braking state and a steering state to obtain a second detection result; and stall a camera facing a rear area of the vehicle when the second detection result indicates that the vehicle is in one of the braking state and the steering state. When the second detection result indicates that the vehicle is in one of the braking state and the steering state, the at least one processor may be used to select the display mode as the target operation mode. The effective information may include information obtained based on the image captured by the camera.

Further, the at least one processor may be used to: detect a status of a trunk lock to obtain a third detection result. When the third detection result indicates that the status of the trunk lock is switched a closed state to an open state, the at least one processor may be used to select the display mode as the target operation mode. The effective information may include remaining capacity of the trunk.

The description of the disclosed embodiments is provided to illustrate the present invention to those skilled in the art.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A control method of an on-vehicle display system, comprising:
    selecting, by the processor of the on-vehicle display system, one of a display mode for information display and a non-display mode for light control in a vehicle, as a target operation mode;
    controlling, by the processor of the on-vehicle display system, the on-vehicle display system to display effective information when the target operation mode is the display mode; and
    controlling, by the processor of the on-vehicle display system, the on-vehicle display system to control light in the vehicle when the target operation mode is the non-display mode;
    detecting, by the processor of the on-vehicle display system, a status of a door lock of the vehicle to obtain a first detection result; and
    starting, by the processor of the on-vehicle display system, a camera facing a rear area of the vehicle, when the first detection result indicates that the status of the door lock of the vehicle is switched from a closed state to an open state, wherein:
        when the first detection result indicates that the status of the door lock of the vehicle is switched from the closed state to the open state, the step of selecting one of the display mode and the non-display mode as the target operation mode includes:
        selecting the display mode as the target operation mode; and
        the effective information includes information obtained based on an image captured by the camera.

2. The control method according to claim 1, wherein:
    the non-display mode includes at least one of a transparent mode, a blocking mode and an illumination mode.

3. The control method according to claim 1, further comprising:
    detecting, by the processor of the on-vehicle display system, whether the vehicle is in one of a braking state and a steering state to obtain a second detection result; and
    starting, by the processor of the on-vehicle display system, a camera facing a rear area of the vehicle, when the second detection result indicates that the vehicle is in one of the braking state and the steering state, wherein:
        when the second detection result indicates that the vehicle is in the braking state and the steering state, the step of selecting one of the display mode and the non-display mode as the target operation mode includes: selecting the display mode as the target operation mode; and
        the effective information includes information obtained based on an image captured by the camera.

4. The control method according to claim 1, further comprising:
    detecting, by the processor of the on-vehicle display system, a status of a trunk lock to obtain a third detection result, wherein when the third detection result indicates that the status of the trunk lock is switched from a closed state to an open state, the step of selecting one of the display mode and the non-display mode as the target operation mode includes:
selecting the display mode as the target operation mode; and
the effective information includes remaining capacity of the trunk.

5. The control method according to claim 1, wherein: the effective information includes environmental information.

6. The control method according to claim 1, wherein: the optical waveguide display assembly includes an optical waveguide transmission structure; and
the optical waveguide transmission structure includes a first substrate, a second substrate, and a liquid crystal layer formed between the first and second substrates.

7. The control method according to claim 6, wherein: the liquid crystal layer includes a polymer and liquid crystal particles distributed in the polymer;
a refractive index of the liquid crystal particles is different from a refractive index of the polymer when applying an electric field; and
the refractive index of the liquid crystal particles is the same as the refractive index of the polymer when not applying the electric field.

8. A control apparatus of an on-vehicle display system, comprising:
a selection circuit, configured to select, one of a display mode for information display and a non-display mode for light control in a vehicle, as a target operation mode;
a first controller, configured to control the on-vehicle display system to display effective information when the target operation mode is the display mode; and
a second controller, configured to control the on-vehicle display system to operate in a manner that affects light in the vehicle when the target operation mode is the non-display mode;
a first detector, configured to detect a status of a door lock of the vehicle to obtain a first detection result; and
a first start circuit, configured to start a camera facing a rear area of the vehicle, when the first detection result indicates that the status of the door lock of the vehicle is switched from a closed state to an open state, wherein:
when the first detection result indicates that the status of the door lock of the vehicle is switched from the closed state to the open state, the selection circuit is used to select the display mode as the target operation mode; and
the effective information includes information obtained based on an image captured by the camera.

9. The control apparatus according to claim 6, wherein: the non-display mode includes at least one of a transparent mode, a blocking mode and an illumination mode.

10. The control apparatus according to claim 8, further comprising:
a second detector, configured to detect whether the vehicle is in one of a braking state and a steering state to obtain a second detection result; and
a second start circuit, configured to start a camera facing a rear area of the vehicle when the second detection result indicates that the vehicle is in one of the braking state and the steering state, wherein:
when the second detection result indicates that the vehicle is in one of the braking state and the steering state, the selection circuit is used to select the display mode as the target operation mode; and
the effective information includes information obtained based on an image captured by the camera.

11. The control apparatus according to claim 8, further comprising:
a third detector, configured to detect a status of a trunk lock to obtain a third detection result, wherein:
when the third detection result indicates that the status of the trunk lock is switched from a closed state to an open state, the selection circuit is used to select the display mode as the target operation mode; and
the effective information includes remaining capacity of the trunk.

12. The control apparatus according to claim 8, wherein: the effective information includes environmental information.

13. A vehicle, comprising:
an on-vehicle display system; and
the control apparatus according to claim 8.

14. The vehicle according to claim 13, wherein the vehicle is provided with an accommodating chamber penetrating through an interior space and an exterior space of the vehicle;
an optical waveguide display assembly is provided in the accommodating chamber; and
the non-display mode includes at least one of a transparent mode, a blocking mode and an illumination mode.

15. A control apparatus of a vehicle, comprising:
an on-vehicle display system;
a memory; and
at least one processor, coupled to the on-vehicle display system and the memory, wherein the memory stores computer-executable instructions for controlling the at least one processor to:
select, one of a display mode for information display and a non-display mode for light control in a vehicle, as a target operation mode;
control the on-vehicle display system to display effective information when the target operation mode is the display mode; and
control the on-vehicle display system to operate in a manner that affects light in the vehicle when the target operation mode is the non-display mode;
wherein the at least one processor is further configured to:
detect a status of a door lock of the vehicle to obtain a first detection result; and
start a camera facing a rear area of the vehicle, when the first detection result indicates that the status of the door lock of the vehicle is switched from a closed state to an open state, wherein:
when the first detection result indicates that the status of the door lock of the vehicle is switched from the closed state to the open state, the at least one processor is used to select the display mode as the target operation mode; and
the effective information includes information obtained based on an image captured by the camera.

16. The control apparatus according to claim 15, wherein: the non-display mode includes at least one of a transparent mode, a blocking mode and an illumination mode.

17. The control apparatus according to claim 15, wherein the at least one processor is further configured to:
detect whether the vehicle is in one of a braking state and a steering state to obtain a second detection result; and start a camera facing a rear area of the vehicle when the second detection result indicates that the vehicle is in one of the braking state and the steering state, wherein:

when the second detection result indicates that the vehicle is in one of the braking state and the steering state, the at least one processor is used to select the display mode as the target operation mode; and the effective information includes information obtained based on an image captured by the camera.

18. The control apparatus according to claim 15, wherein the at least one processor is further configured to:

detect a status of a trunk lock to obtain a third detection result, wherein:

when the third detection result indicates that the status of the trunk lock is switched from a closed state to an open state, the at least one processor is used to select the display mode as the target operation mode; and the effective information includes remaining capacity of the trunk.

* * * * *